US010066956B2

(12) United States Patent
Huang et al.

(10) Patent No.: US 10,066,956 B2
(45) Date of Patent: Sep. 4, 2018

(54) NAVIGATION TECHNOLOGY IN THREE-DIMENSIONAL SCENES

(71) Applicant: SHENZHEN INSTITUTES OF ADVANCED TECHNOLOGY CHINESE ACADEMY OF SCIENCES, Shenzhen, Guangdong (CN)

(72) Inventors: Hui Huang, Guangdong (CN); Zhuming Hao, Guangdong (CN); Minglun Gong, Guangdong (CN); Daniel Lischinski, Guangdong (CN); Daniel Cohen-Or, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 12 days.

(21) Appl. No.: 15/390,000

(22) Filed: Dec. 23, 2016

(65) Prior Publication Data
US 2017/0153116 A1    Jun. 1, 2017

Related U.S. Application Data

(63) Continuation of application No. PCT/CN2015/078949, filed on May 14, 2015.

(51) Int. Cl.
*G06K 9/00* (2006.01)
*G01C 21/36* (2006.01)
(Continued)

(52) U.S. Cl.
CPC ........ *G01C 21/3602* (2013.01); *G06T 7/0002* (2013.01); *G06T 7/60* (2013.01);
(Continued)

(58) Field of Classification Search
CPC .................................. G06T 7/00; G01C 21/00
(Continued)

(56) References Cited

U.S. PATENT DOCUMENTS 8,044,953 B2 * 10/2011 Khan .................. G06F 3/04815
345/420
8,326,442 B2    12/2012 Amsterdam et al.
(Continued)

FOREIGN PATENT DOCUMENTS

CN    102332175    1/2012
CN    103971392    8/2014
(Continued)

OTHER PUBLICATIONS

International search Report, issued in the corresponding PCT application No. PCT/CN2015/078949, dated Feb. 15, 2016, 8 pages.
(Continued)

*Primary Examiner* — Abolfazl Tabatabai
(74) *Attorney, Agent, or Firm* — Hamre, Schumann, Mueller & Larson, P.C.

(57) ABSTRACT

The present disclosure provides a navigation method based on a three-dimensional scene, comprising: calculating an interest value of a viewpoint of a camera based on heights, volumes, irregularities and uniqueness of buildings in a scene; generating trajectory parameters of the camera according to the interest value of the viewpoint, so as to navigate according to the trajectory parameters. The navigation method based on a three-dimensional scene of the present disclosure obtains a reasonable interest value of the viewpoint based on heights, volumes, irregularities and uniqueness of the buildings, thereby achieving a high-quality navigation.

34 Claims, 11 Drawing Sheets

(51) Int. Cl.
  *G06T 7/80* (2017.01)
  *G06T 7/00* (2017.01)
  *G06T 19/00* (2011.01)
  *G06T 7/60* (2017.01)
  *G06T 17/05* (2011.01)

(52) U.S. Cl.
  CPC .............. *G06T 7/80* (2017.01); *G06T 17/05* (2013.01); *G06T 19/003* (2013.01); *G01C 21/3638* (2013.01); *G06T 2200/04* (2013.01); *G06T 2207/10028* (2013.01); *G06T 2207/30184* (2013.01); *G06T 2207/30241* (2013.01); *G06T 2207/30244* (2013.01)

(58) Field of Classification Search
  USPC .................................. 382/103; 348/169–172
  See application file for complete search history.

(56) References Cited

U.S. PATENT DOCUMENTS

| | | | | |
|---|---|---|---|---|
| 9,326,442 | B1* | 5/2016 | Bergmeier | A01C 5/062 |
| 9,420,234 | B2* | 8/2016 | Greenhill | H04N 7/18 |
| 2015/0206343 | A1* | 7/2015 | Mattila | G06T 17/05 |
| | | | | 345/420 |

FOREIGN PATENT DOCUMENTS

| | | |
|---|---|---|
| CN | 104867142 | 8/2015 |
| EP | 2420975 | 6/2011 |
| JP | 2005316702 | 11/2005 |
| WO | 2014041188 | 3/2014 |

OTHER PUBLICATIONS

Grabler et al., "Automatic Generation of Tourist Maps", Geomatics & Spatial Information Technology, vol. 27, No. 3, Mar. 30, 2014, 59 pages.

Li, Yuping, "Path Design Based on 3D City Models", Geomatics & Spatial Information Technology, vol. 27, No. 3, Mar. 30, 2014, 4 pages.

Ma et al., "Design and Implementation of Virtual Library Roaming Navigation System", Researches in Library Science, No. 13, Jul. 15, 2010, 4 pages.

First Office Action, issued in the corresponding Chinese patent application No. 201510245775.X, dated Mar. 30, 2017, 7 pages.

Search Report, issued in the corresponding Chinese patent application No. 201510245775.X, dated Mar. 30, 2017, 4 pages.

Grabler et. al, "Automatic Generation of Tourist Maps", ACM Transactions on Graphics, vol. 27, No. 3, Article 100, Aug. 2008, 12 pages.

Xiu et al., "Optimal Design Method for Virtual Roam Route in 3D Scenes", Metal Mine, series No. 466, Apr. 2015, pp. 242-245.

* cited by examiner

NAVIGATION TECHNOLOGY IN THREE-DIMENSIONAL SCENES

This application is a continuation of International Application No. PCT/CN2015/078949, filed on May 14, 2015, which is hereby incorporated by reference in its entirety.

FIELD OF THE INVENTION

The present disclosure relates to the field of computer graphics, and particularly, to a navigation method based on a three-dimensional scene.

BACKGROUND OF THE INVENTION

In the past decade, with the rapid development of three-dimensional modeling technology, a lot of three-dimensional scenes such as Google Earth quickly appear, however, the navigation technology based on a three-dimensional scene has not been well developed.

Currently, there have been many technical researches on the camera control and the three-dimensional virtual scene navigation, mainly concerning the automatic and semi-automatic technologies about viewpoint selection, camera trajectory selection and camera movement control.

The researches on viewpoint selection such as viewpoint entropy. Utilizing entropy to measure the distribution of the building facades under the specific view. Analyzing the viewpoint significance using descriptors including building surface visibility, object significance, curvature, profile and topology complexity; and analyzing the semantic features of some definitions (including style, position, structure, etc. of the building) based on intelligent learning.

The researches on camera trajectory planning, for example, using the path planning and the graph searching technology to navigate automatically in a three-dimensional museum; and technologies such as collision detection, object visibility analysis and path smoothing from the perspective of geometrical analysis. The above methods mainly consider the generation of the camera trajectory while omitting the camera moving speed. Later, some researches proposed an optimization method of automatically calculating a camera moving speed based on a predefined camera path, which mainly considers keeping the user's attentions.

The researches on camera movement such as movement mode between interest value points predefined by the user. The above method adds a manner of accepting the user's feedback and simple interaction during the navigation.

The automatic navigation methods based on a three-dimensional scene at present mainly have the following problems: firstly, many navigation technologies are still based on fixed camera speed, viewpoint and height, without considering scene features and the user's attention; secondly, many navigation technologies are not fully automatic, and most of them require the user to make a number of calibrations and inputs; thirdly, the existing navigation technologies are very limited during usage, and can only be applied to a special scene; and fourth, the visual perception during the navigation is not so continuous or smooth enough.

SUMMARY OF THE INVENTION

The present disclosure proposes a navigation method based on a three-dimensional scene, a computer readable storage medium, and a device, so as to overcome one or more defects in the prior art.

The present disclosure proposes a navigation method based on a three-dimensional scene, comprising: calculating an interest value of a viewpoint of a camera based on heights, volumes, irregularities and uniqueness of buildings in a scene; generating trajectory parameters of the camera according to the interest value of the viewpoint, so as to navigate according to the trajectory parameters.

The present disclosure proposes a computer readable storage medium containing computer readable instructions, wherein when being executed, the computer readable instructions enable a processor to perform at least the operations of: calculating an interest value of a viewpoint of a camera based on heights, volumes, irregularities and uniqueness of buildings in a scene; generating trajectory parameters of the camera according to the interest value of the viewpoint, so as to navigate according to the trajectory parameters.

The present disclosure proposes a device, comprising: a processor; and a memory for computer readable instructions, which when being executed, enable the processor to perform the operations of: calculating an interest value of a viewpoint of a camera based on heights, volumes, irregularities and uniqueness of buildings in a scene; generating trajectory parameters of the camera according to the interest value of the viewpoint, so as to navigate according to the trajectory parameters.

The embodiments of the present disclosure calculate the interest value of the viewpoint based on heights, volumes, irregularities and uniqueness of the buildings, and achieve a high quality navigation.

Further, the embodiments of the present disclosure can perform an importance analysis of the given scene, and generate adaptive speed, viewpoint and height according to the interest value of the viewpoint, while ensuring a smooth camera trajectory, which is a very effective automatic navigation path generation mode. The embodiments of the present disclosure automatically analyze the importance value of the viewpoint, and calculate the adaptive speed and the smooth camera trajectory after the camera posture correction based on an analysis result, thus the user interaction is especially succinct.

BRIEF DESCRIPTION OF THE DRAWINGS

In order to more clearly describe the technical solutions in the embodiments of the present disclosure or the prior art, the accompanying drawings to be used in the descriptions of the embodiments or the prior art will be briefly introduced as follows. Obviously, the accompanying drawings in the following descriptions just illustrate some embodiments of the present disclosure, and a person skilled in the art can obtain other accompanying drawings from them without paying any creative effort. In which.

DETAILED DESCRIPTION OF THE PREFERRED EMBODIMENTS

In order that the objectives, technical solutions and advantages of the embodiments of the present disclosure are clearer, the embodiments of the present disclosure will be further described in details as follows with reference to the accompanying drawings. Here the exemplary embodiments of the present disclosure and descriptions thereof are just used to explain, rather than limiting, the present disclosure.

Figure 1:
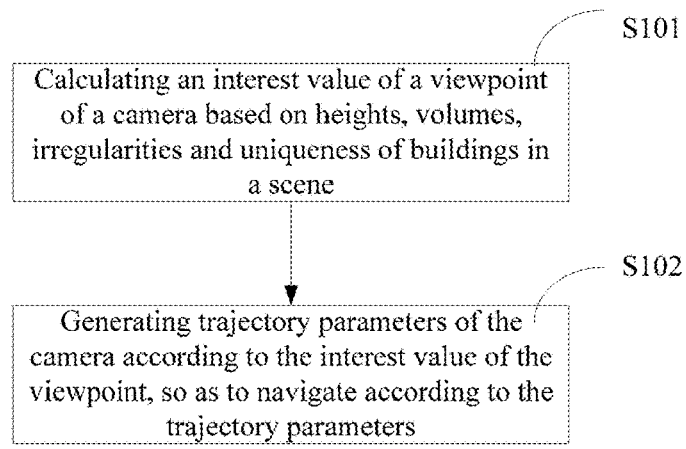
FIG. 1 is a flow diagram of a navigation method based on a three-dimensional scene in one embodiment of the present disclosure.

FIG. 1 is a flow diagram of a navigation method based on a three-dimensional scene in one embodiment of the present disclosure. As illustrated in FIG. 1, the navigation method in the embodiment of the present disclosure comprises:

step S101: calculating an interest value of a viewpoint of a camera based on heights, volumes, irregularities and uniqueness of buildings in a scene;

step S102: generating trajectory parameters of the camera according to the interest value of the viewpoint, so as to navigate according to the trajectory parameters.

The navigation method based on a three-dimensional scene in the embodiment of the present disclosure sufficiently considers the user's interest tendency to the buildings in the scene, including heights, volumes, irregularities and uniqueness of the buildings, thereby well meeting the user's expectation on the buildings viewed in the navigation image.

Since the buildings occupy important positions in the scene, the advantages of the present disclosure are described through the buildings in various embodiments of the present disclosure. But a person skilled in the art knows that the navigation method based on a three-dimensional scene in the embodiments of the present disclosure may consider importance of other objects (e.g., transportation facilities, trees, etc.) in the scene, so as to meet the requirements of different navigation scenes.

In step S101, each camera position is corresponding to a viewpoint, each viewpoint is corresponding to a scene, and each scene is corresponding to a plurality of buildings. For a viewpoint, an importance value of each building in a scene corresponding to the viewpoint is calculated, and then the importance values of the buildings are further processed to obtain an interest value of the viewpoint.

Figure 2:
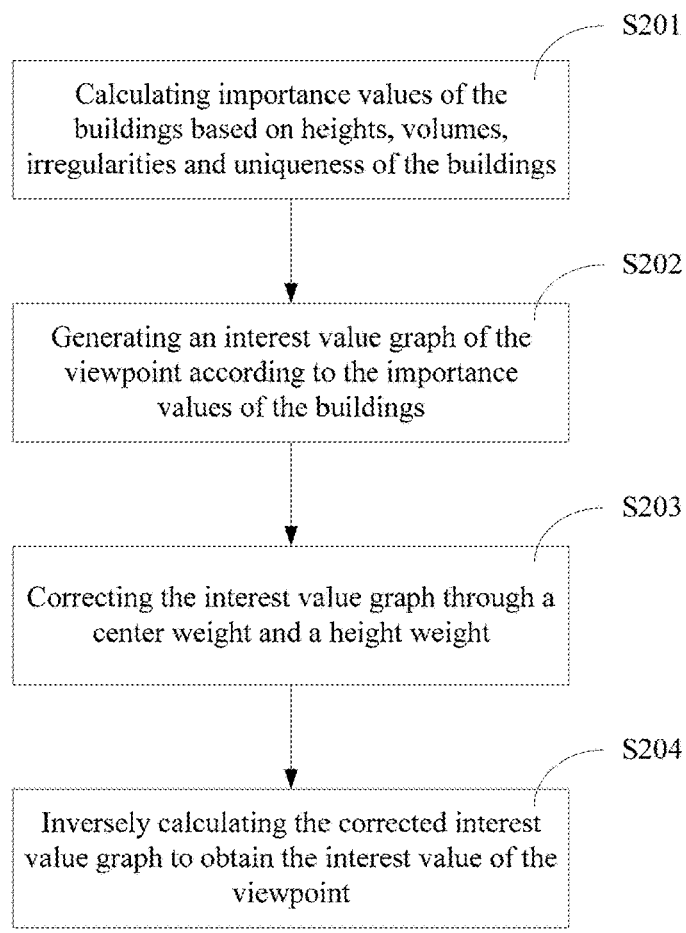
FIG. 2 is a flow diagram of calculation of an interest value of a viewpoint in one embodiment of the present disclosure.

FIG. 2 is a flow diagram of calculation of an interest value of a viewpoint in one embodiment of the present disclosure. As illustrated in FIG. 2, step S101 of calculating an interest value of a viewpoint of a camera based on heights, volumes, irregularities and uniqueness of buildings in a scene may comprise:

step S201: calculating importance values of the buildings based on heights, volumes, irregularities and uniqueness of the buildings;

step S202: generating an interest value graph of the viewpoint according to the importance values of the buildings;

step S203: correcting the interest value graph through a center weight and a height weight;

step S204: inversely calculating the corrected interest value graph to obtain the interest value of the viewpoint.

The method for calculating the interest value of the viewpoint in the embodiment of the present disclosure not only considers the importance values of the buildings in the scene, but also incorporates a factor that the user is more interested in the center region through the center weight, and incorporates a factor that the user observes a building from a certain distance through the height weight, thereby further enabling the navigation result to be closer to the user's focus.

In step S102, the viewpoint of each camera is corresponding to a group of trajectory parameters of the camera, which may include camera focal point, camera posture, camera moving speed and tracked object speed, wherein the camera posture may be represented with parameters such as camera three-dimensional position, camera orientation, camera pitch angle and camera yaw angle.

Figure 3:
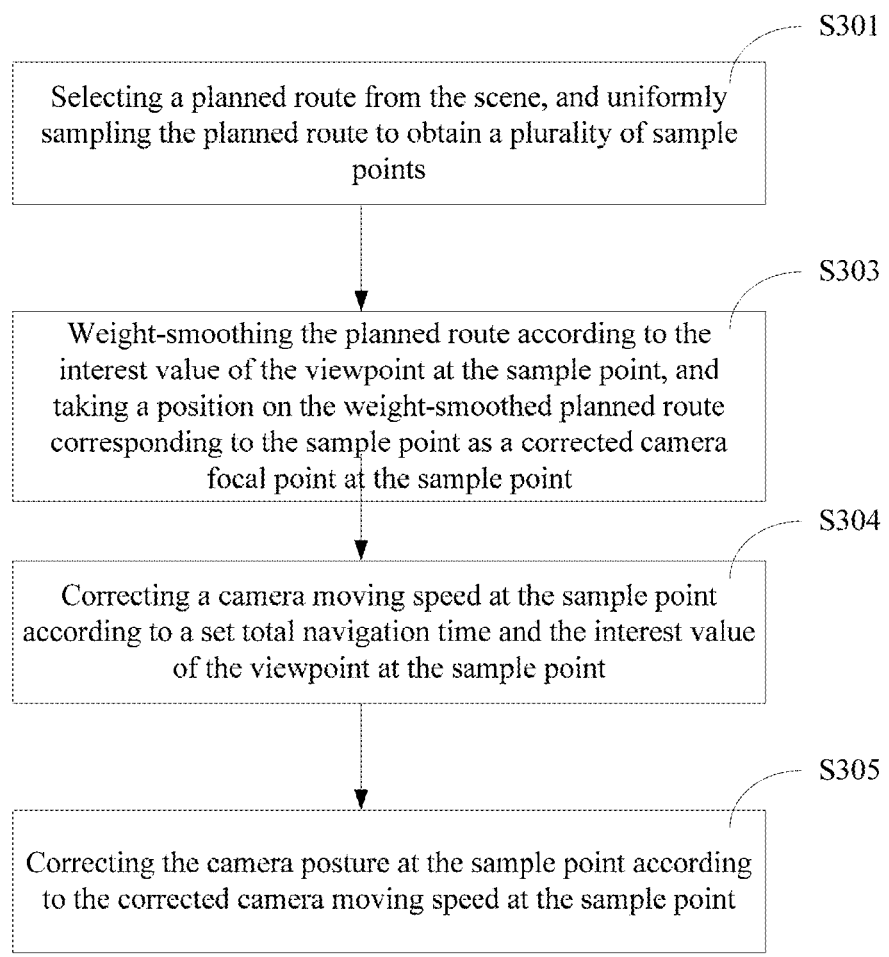
FIG. 3 is a flow diagram of generation of trajectory parameters in one embodiment of the present disclosure.

FIG. 3 is a flow diagram of generation of trajectory parameters in one embodiment of the present disclosure. As illustrated in FIG. 3, step S102 of generating trajectory parameters of the camera according to the interest value of the viewpoint, so as to navigate according to the trajectory parameters may comprise:

step S301: selecting a planned route from the scene, and uniformly sampling the planned route to obtain a plurality of sample points;

step S303: weight-smoothing the planned route according to the interest value of the viewpoint at the sample point, and taking a position on the weight-smoothed planned route corresponding to the sample point as a corrected camera focal point at the sample point;

step S304: correcting a camera moving speed at the sample point according to a set total navigation time and the interest value of the viewpoint at the sample point;

step S305: correcting the camera posture at the sample point according to the corrected camera moving speed at the sample point.

In the embodiment of the present disclosure, the corrected camera posture at the sample point and the corrected camera moving speed at the sample point are taken as the trajectory parameters of the camera.

In the three-dimensional scene navigation, the given enormous search space and the complex navigation requirement are always contradictory to each other, and it is substantially infeasible to directly obtain an overall optimization scheme.

The navigation method based on a three-dimensional scene in the embodiment of the present disclosure divides the enormous constrained optimization issue into a series of small optimization steps, with each optimization step increasingly controllable, and achieves those optimization steps by iteration. The embodiment of the present disclosure solves the contradiction in the three-dimensional scene navigation, and brings the user with navigation experiences better meeting his requirement.

In one embodiment, before step S303 is started, parameters of the camera at respective sample points are initialized as initial values for subsequent correction (optimization) steps.

Figure 4:
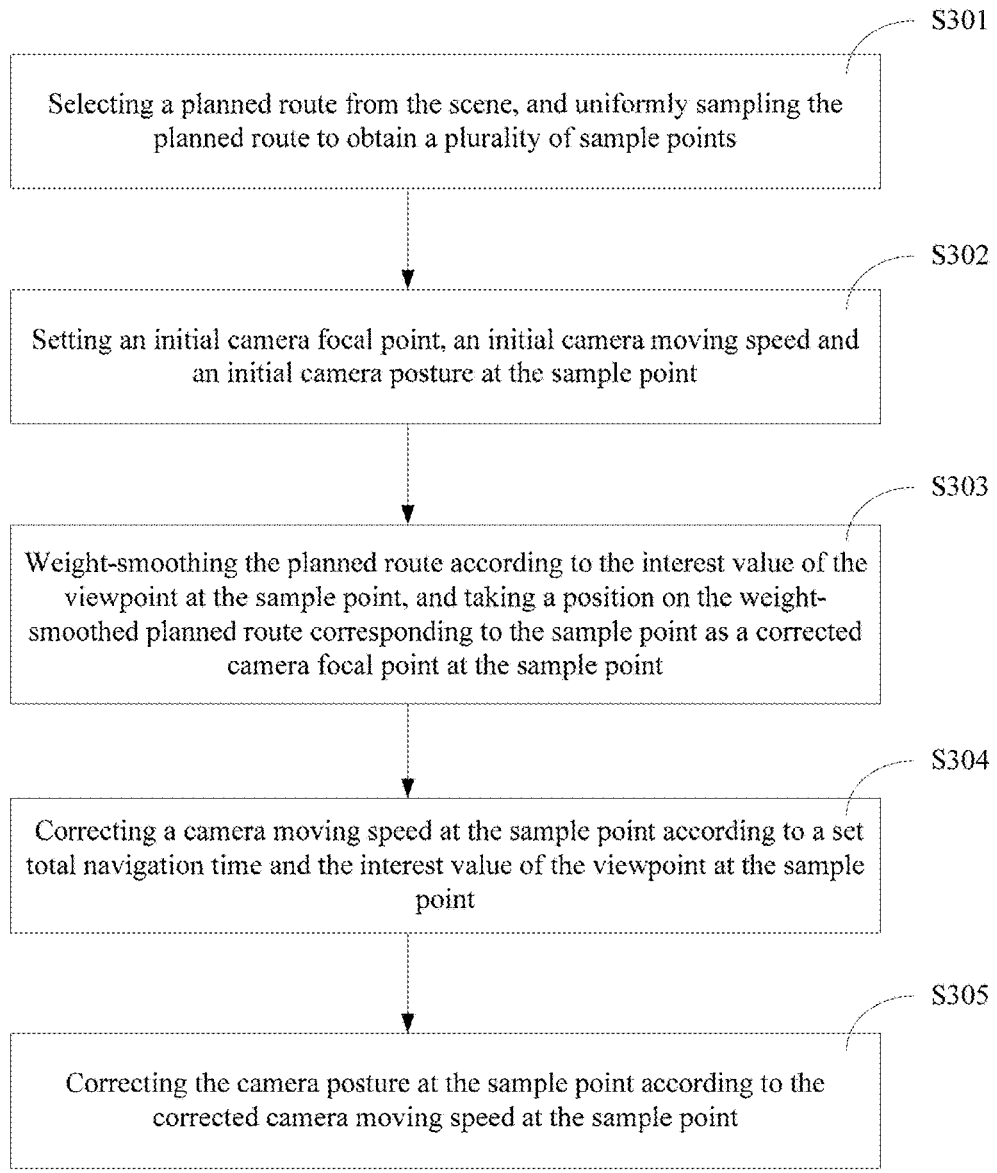
FIG. 4 is a flow diagram of generation of trajectory parameters in one embodiment of the present disclosure.

FIG. 4 is a flow diagram of generation of trajectory parameters in one embodiment of the present disclosure. As illustrated in FIG. 4, the generation of the trajectory parameters of the camera may further comprise:

step S302: setting an initial camera focal point, an initial camera moving speed and an initial camera posture at the sample point.

The method for generating the trajectory parameters of the camera in the embodiment of the present disclosure sets appropriate initial values for a plurality of parameters, and optimizes or corrects the appropriate initial values to achieve a good navigation effect.

After step S305, the camera posture and the camera moving speed corrected for the first time may not be taken as the trajectory parameters of the camera, and a plurality of iterative calculation may be made to obtain better trajectory parameters.

Figure 5:
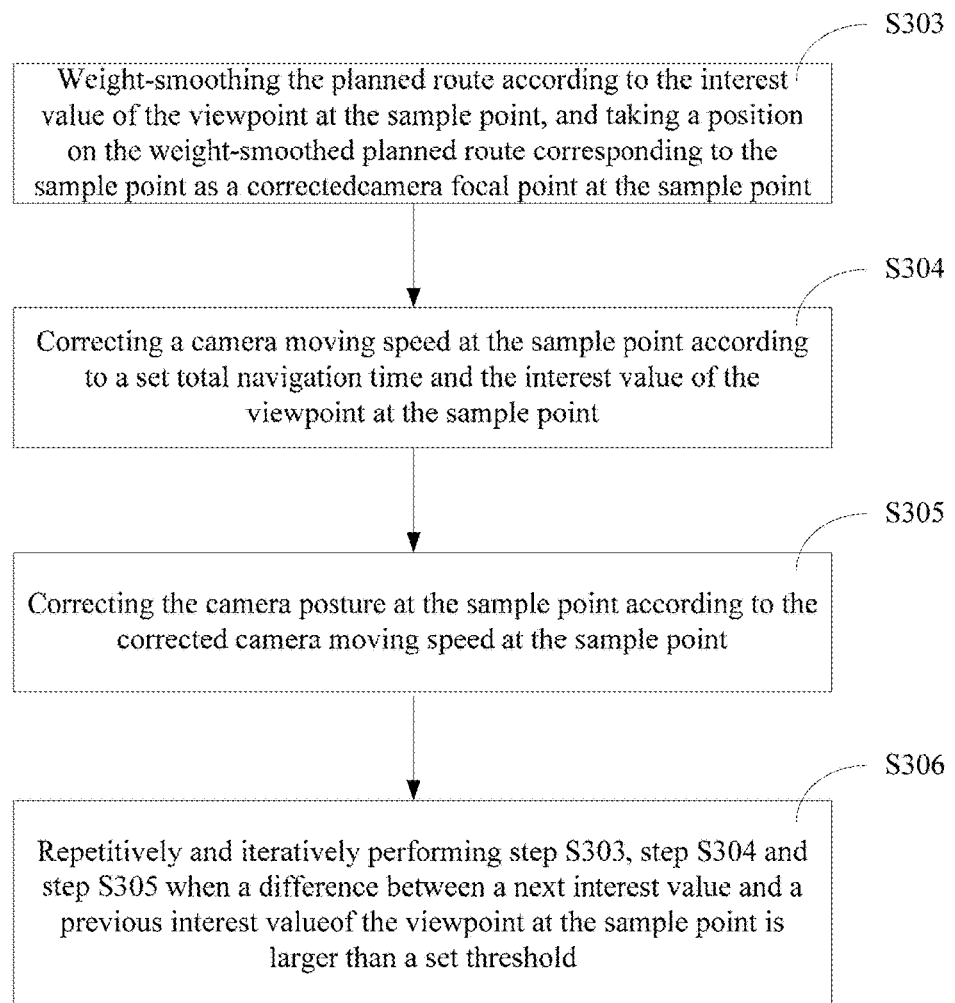
FIG. 5 is a flow diagram of generation of trajectory parameters in one embodiment of the present disclosure.

FIG. 5 is a flow diagram of generation of trajectory parameters in one embodiment of the present disclosure. As illustrated in FIG. 5, the generation of the trajectory parameters of the camera may further comprise:

step S306: repetitively and iteratively performing step S303, step S304 and step S305 when a difference between a next interest value and a previous interest value of the viewpoint at the sample point is larger than a set threshold.

In step S306, the next interest value (e.g., a second interest value) of the viewpoint at the sample point is obtained based on a camera focal point at the sample point after a previous correction (e.g., a first correction), a camera moving speed at the sample point after the previous correction (e.g., the first correction), and a camera posture at the sample point after the previous correction (e.g., the first correction).

When step S303, step S304 and step S305 are iteratively performed, a previous interest value (e.g., a first interest value/initial interest value) of the viewpoint at the sample point is replaced with a next interest value (e.g., a second interest value) of the viewpoint at the sample point, a previous camera focal point (e.g., a first camera focal point/initial camera focal point) at the sample point is replaced with a next camera focal point (e.g., a second camera focal point) at the sample point, a previous camera moving speed (e.g., a first camera moving speed) at the sample point is replaced with a next camera moving speed (e.g., a second camera moving speed) at the sample point, and a previous camera posture (e.g., a first camera posture/initial camera posture) at the sample point is replaced with a next camera posture (e.g., a second camera posture) at the sample point.

The iterative step is ended when the difference between the next interest value (e.g., the second interest value) of the viewpoint at the sample point and the previous interest value (e.g., the first interest value/initial interest value) thereof at the sample point is smaller than or equal to the set threshold. In one embodiment, the iterative algorithm may be ended at the third iteration.

In other words, in the process of the first correction, the method for generating the trajectory parameters in the embodiment of the present disclosure calculates an initial interest value (first interest value) of the viewpoint, and optimizes or corrects an initial camera focal point, an initial camera moving speed and an initial camera posture to obtain a second camera focal point, a second camera moving speed and a second camera posture; calculates a second interest value of the viewpoint according to the second camera focal point, the second camera moving speed and the second camera posture; and if a difference between the second interest value of the viewpoint and the initial interest value (first interest value) of the viewpoint is larger than the set threshold, a second optimization or correction is made to obtain a third camera focal point, a third camera moving speed and a third camera posture. The iterative calculation is performed successively until the difference between the next interest value of the viewpoint and the previous interest value thereof is smaller than or equal to the set threshold. If n optimizations or corrections are made, the camera posture and the camera moving speed obtained after the nth optimization or correction are taken as the trajectory parameters of the camera, wherein and n is an integer.

The method for generating the trajectory parameters in the embodiment of the present disclosure gradually optimizes the trajectory parameters of the camera through the iterative correction, so that the navigation effect better meets the user's expectation and requirement.

In step S201, the height, volume, irregularity and uniqueness of a building can be absorbed in the importance value of the building through a plurality of different models.

In one embodiment, the importance value of a building can be calculated through the following model, and the importance value of a building is:

$$S(b)=\alpha S_h(b)+\beta S_v(b)+\gamma S_r(b)+\delta S_u(b) \qquad (1),$$

In formula (1), $\alpha$, $\beta$, $\gamma$ and $\delta$ are weight coefficients, $S_h(b)$ is a height interest value of building b, $S_v(b)$ is a volume importance value of building b, $S_r(b)$ is an irregularity value of building b, $S_u(b)$ is an uniqueness value of building b, and building b is the above building.

The height interest value of building b is:

$$S_h(b) = \frac{\text{height}(b)}{\max_c \in \Omega \ \text{height}(c)}, \qquad (2)$$

In formula (2), height (b) is a height of building b, and $\Omega$ height (c) is a set of heights of building c near the planned route.

The height interest value of the building in the embodiment of the present disclosure considers the influence on the user's focus by the height. The height interest value in the embodiment of the present disclosure is a normalized height score item, which considers the relative height of the building in the scene. For example, the skyscraper is usually a landmark building or landscape of a city, and this factor is considered for the height interest value of the above building.

The volume importance value of building b is:

$$S_v(b) = \frac{\text{volume}(b)}{\max_c \in \Omega \ \text{volume}(c)}, \qquad (3)$$

In formula (3), volume (b) is a volume of building b, and $\Omega$ volume (c) is a set of volumes of building c near the planned route.

In formula (3), volume (b) measures a shell volume of building b. Since the model of building b is not certainly watertight, in one embodiment, the volume of building b, i.e., volume (b), may be calculated based on two depth images projected in parallel and rendered from the front and the back of building b, respectively. The depth interval of building b at corresponding pixel point in the depth image will be accumulated to obtain a volume value approximate to the volume of building b.

The method for calculating the volume of the building in the embodiment of the present disclosure is precise when building b has no hole structure in the projection direction, and most buildings meet such structure condition, thus the above method for calculating the volume of the building can precisely consider the influence on the interest value of the viewpoint by the volume of the building.

The volume importance value in the embodiment of the present disclosure considers the influence on the user's focus by the volume. A large volume architectural structure, such as a sports venue or a shopping center, is usually taken as a landmark used in the navigation. The volume importance value can contain the influence factor.

The irregularity value of building b is:

$$S_r(b) = 1 - \frac{\text{volume}(b)}{\text{volume}(MVBB(b))}, \quad (4)$$

In formula (4), volume (MVBB(b)) is a volume of a body bounding box of building b. The irregularity value of a building can also be called as an anisotropy value.

As to the user, buildings of regular box shapes always seem dull, while buildings of irregular structures will be interesting.

In the embodiment of the present disclosure, when the irregularity value of a building is to be calculated, the building is divided into a plurality of small body bounding boxes MVBB, and the irregularity of building b is defined as a difference between its volume and its box, so as to quantize the irregularity of building b.

The uniqueness value of building b is:

$$S_u(b) = \min_{d \in \Omega_b} M(b,d) \quad (5),$$

In formula (5), $\Omega_b$ is a set of buildings d within a predetermined range near building b, and M(b, d) is an uniqueness difference between building b and buildings d within the predetermined range, wherein, $$M(b,d) = 1 - \frac{\text{volume}(\bigcap(MVBB(b), MVBB(d)))}{\text{volume}(\bigcup(MVBB(b), MVBB(d)))}, \quad (6)$$

In formula (6), volume ($\cap$(MVBB(b), MVBB(d))) is a volume of an intersection result $\cap$(MVBB(b), MVBB(d)) of a body bounding box MVBB(b) of building b and a body bounding box MVBB(d) of building d, and volume (U(MVBB(b), MVBB(d))) is a volume of an union result U(MVBB(b), MVBB(d)) of the body bounding box MVBB (b) of building b and the body bounding box MVBB(d) of building d.

The model of the uniqueness value of building b in the embodiment of the present disclosure mainly considers the difference between a building and adjacent buildings, quantizes the uniqueness value of the building, and simplifies the calculation process of the uniqueness value of the building. The uniqueness values in the embodiment of the present disclosure are obtained by evaluating their sounding boxes. In one scene, for example a unique building often attracts the user's attention, and this influence factor can be considered for the uniqueness value of the building in the embodiment of the present disclosure.

The weight coefficient in formula (1) can be calculated with many methods. In one embodiment, it can be calculated by solving an optimized weight equation which is:

$$(\alpha, \beta, \gamma, \delta) = \operatorname*{argmin}_{\substack{(\alpha,\beta,\gamma,\delta) \\ \alpha+\beta+\gamma+\delta=1}} \Sigma_i K(R(\alpha, \beta, \gamma, \delta), R_i), \quad (7)$$

In formula (7), $R_i$ is a given user scoring value based on height, volume, irregularity and uniqueness of a buildings in a given set of buildings; $R(\alpha,\beta,\gamma,\delta)$ is an importance value calculated according to values of a given group of weight coefficients and values of $S_h(b)$, $S_v(b)$, $S_r(b)$ and $S_u(b)$ of the building in the given set of buildings; $K(R(\alpha,\beta,\gamma,\delta), R_i)$ is a first distance between the given user scoring value $R_i$ and the importance value $R(\alpha,\beta,\gamma,\delta)$ of the building in the set of buildings; and if the first distance is less than a set distance, the values of the group of weight coefficients are taken as values of the weight coefficients $\alpha$, $\beta$, $\gamma$ and $\delta$.

In one embodiment, the first distance $K(R(\alpha,\beta,\gamma,\delta), R_i)$ can be calculated with a Kendall tau method, wherein the Kendall tau method is a method used in the article "A new measure of rank correlation. Biometrica" published by Kendall etc. in a journal Biometrica (1983, volume 30, pages 81-39).

Figure 6:
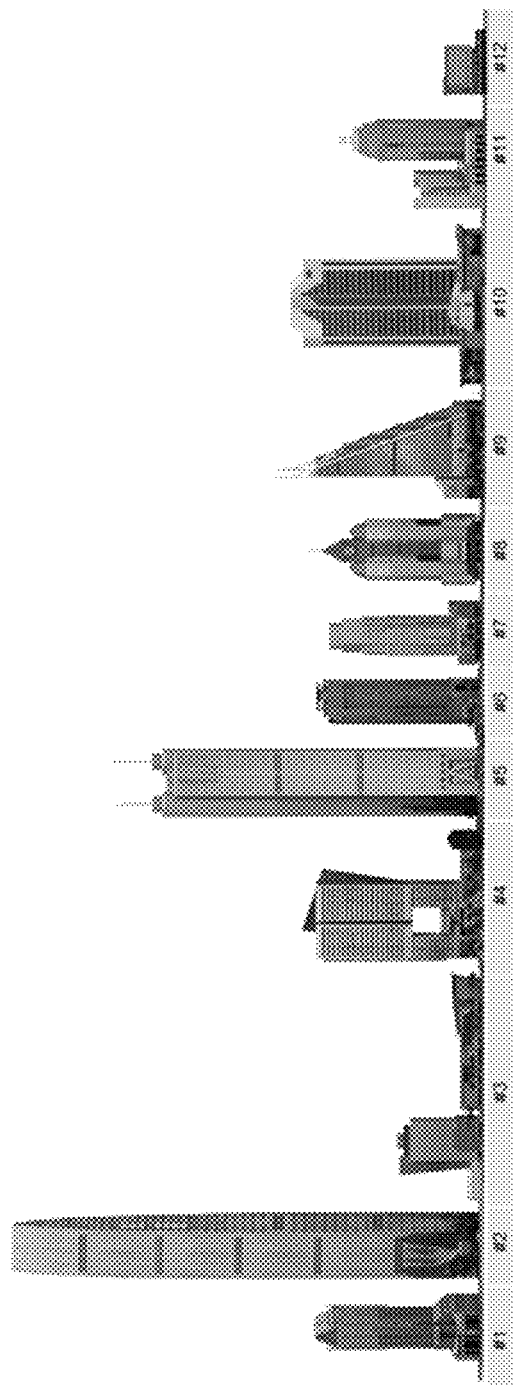
FIG. 6 is a structure diagram of a set of buildings for calculating weight coefficients in one embodiment of the present disclosure.
Figure 7:
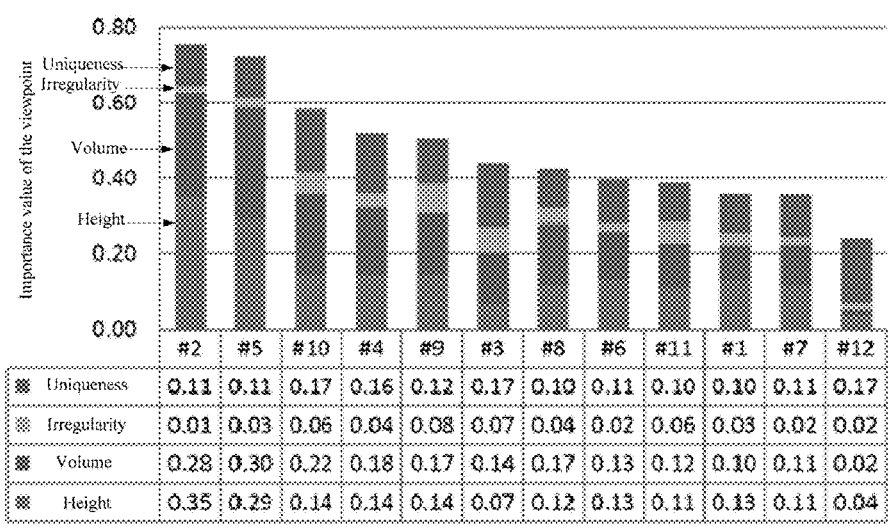
FIG. 7 illustrates a weighted scoring result of the buildings in FIG. 6.

FIG. 6 is a structure diagram of a set of buildings for calculating weight coefficients in one embodiment of the present disclosure. As illustrated in FIG. 6, buildings included in a scene of a three-dimensional virtual city construct a set of buildings. A plurality of users are required to sort those in the set of buildings according to their interests in the buildings of FIG. 6, so as to obtain a plurality of groups of weighted scoring results as illustrated in FIG. 7. Next, a fitting is performed in formula (7) according to the plurality of groups of weighted scoring results, so as to obtain the weight coefficient of each item.

Formula (7) may be calculated in different methods, such as a random search method of progressive refinement or a quasi-newton method. By performing a random search for the weighted scoring results, the weights in formula (7) can be calculated as $\alpha=0.35$, $\beta=0.3$, $\gamma=0.15$, and $\delta=0.2$.

FIG. 7 lists the importance value of each building in FIG. 6, and draws a histogram that is corresponding to those importance values. As illustrated in FIG. 7, higher building #2 and building #5 have highest scores of height interest value and volume importance value, respectively; building #9 and building #3 of irregular shapes have very high scores of irregularity values; building #1, building #8 and building #11 have similar shapes, and the scores of their uniqueness values are very low; as compared with other buildings in FIG. 6, building #12 has a particularly small volume, and the score of its uniqueness value is high.

Thus, the height interest value, the volume importance value, the irregularity value and the uniqueness value of each building in FIG. 6 is in conformity with the actual appearance of the building, which strongly proves the effectiveness of the navigation method based on a three-dimensional scene.

In addition, by weighting the scores of height, volume, irregularity and uniqueness of a building, it can be seen from the histogram in FIG. 7, building #2 and building #5 have the highest importance, while building #12 has the lowest importance. This result also coincides with the statistical result of the user's research, which further proves that the model of height, volume, irregularity and uniqueness of a building in the embodiment of the present disclosure is effective.

After the importance value of the building in the three-dimensional model scene at each navigation point is obtained through step S201, step S202 is performed to generate an interest value graph of a viewpoint corresponding to the scene, such as a color energy graph. The importance values of the buildings are mapped into a color model scene where the scores of the importance values colors are represented with colors from red to blue, and warm colors represent high scores. With respect to a particular viewpoint, a two-dimensional energy graph containing surfaces of all building models at the particular viewpoint can be obtained, and a score of interest value of the viewpoint can be obtained simply by accumulating all pixel values in the energy graph of the viewpoint.

However, in step S203, a more reasonable score of interest value of the viewpoint can be obtained by introducing a center weight and a depth weight to correct the interest value graph (interest value) of the viewpoint.

In one embodiment, the center weight may have the weight decreased in a trigonometric function from the center to the outside, so that a center position of the image has a high score of interest value, and a position far away from the center has a low score of interest value, to meet the requirement that the user focus more on the center region.

In one embodiment, the center weight may be represented as:

$$\omega_c(i) = \sqrt{\cos\left(\frac{\pi\|i-o\|}{2r}\right)}, \tag{8}$$

In formula (8), i is a pixel position in the interest value graph, o is a center of the interest value graph, and r is a half of a diagonal of the interest value graph.

In one embodiment, the depth weight is a weight $\omega_d$ based on the distance. Assuming that the ideal viewing distance is d*, for example d*=150 m, and the pixel area of the projection of the scene model surface is A in the ideal viewing distanced*; if the viewing depth at pixel i of the image is d(i), the projection of area A at pixel i is approximately equal to $$A \cdot \left(\frac{d(i)}{d^*}\right)^2,$$

and the weight item (depth weight) based on the distance can be represented as:

$$\omega_d(i) = \min\left(\left(\frac{d(i)}{d^*}\right)^2, 1\right), \tag{9}$$

In formula (9), d* is a set viewing depth, and d(i) is a viewing depth at a pixel position i in the image.

When the camera is closer to a given building, the projection of the building occupies more pixel position. In that case, a simple summarization of the score of each pixel leads to a very high score completely caused by the building. However, the user usually more likes to view a building at a certain distance, and no more information can be obtained when the camera is closer to the building, thus the contribution to the viewpoint will not be increased. In fact, when the camera is very close and only a part of the building can be seen, the contribution becomes less.

The depth weight in the embodiment of the present disclosure considers the above factor, thereby avoiding an excessive negative influence on the interest value of the viewpoint by the building in a short distance.

After the correction with formula (8) of the center weight and formula (9) of the depth weight, the interest value of the viewpoint corresponding to the interest value graph, i.e., a total score of interest value of the particular viewpoint can be represented as:

$$I_j = \frac{1}{N}\Sigma_i \omega_c(i)\omega_d(i)S(i), \tag{10}$$

In formula (10), N is the number of pixels in the interest value graph, N≥1, and N is an integer; j is a serial number of the sample point, j∈[0, n], n≥1, and n is a positive integer; S(i) is an interest value of the viewpoint at the pixel position i in the interest value graph. The original interest value graph and the weighting range can be normalized between [0,1], thus the weighted interest value graph can also fall within the range.

Figure 8A:
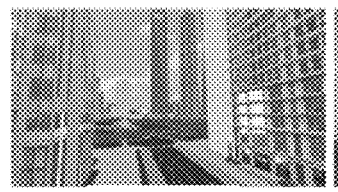
FIGS. 8A to 8C are texture diagrams of a scene at three different viewpoints.
Figure 8B:
Figure 8C:
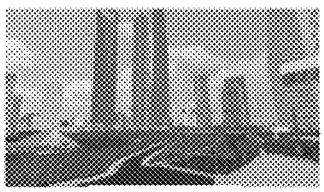
Figure 8D:
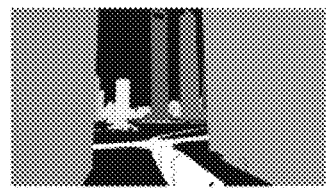
FIGS. 8D to 8F are effect diagrams before weighting and corresponding to the viewpoints in FIGS. 8A to 8C, respectively, in one embodiment of the present disclosure.
Figure 8E:
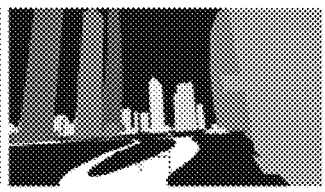
Figure 8F:
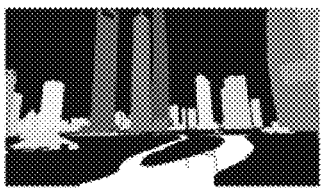
Figure 8G:
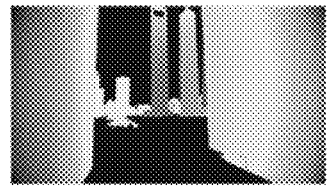
FIGS. 8G to 8I are effect diagrams before weighting and corresponding to the viewpoints in FIGS. 8A to 8C, respectively, in one embodiment of the present disclosure.
Figure 8H:
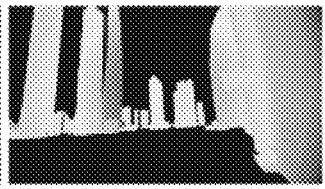
Figure 8I:
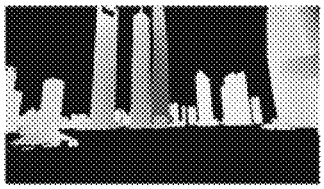

FIGS. 8A to 8C are texture diagrams of a scene at three different viewpoints; FIGS. 8D to 8F are effect diagrams before weighting and corresponding to the viewpoints in FIGS. 8A to 8C, respectively, in one embodiment of the present disclosure; and FIGS. 8G to 8I are effect diagrams before weighting and corresponding to the viewpoints in FIGS. 8A to 8C, respectively, in one embodiment of the present disclosure. The interest value of a first viewpoint corresponding to FIG. 8D is I=0.36, the interest value of a second viewpoint corresponding to FIG. 8E is I=0.29, the interest value of a third viewpoint corresponding to FIG. 8F is I=0.28, the interest value of a first viewpoint corresponding to FIG. 8G is I=0.199, the interest value of a second viewpoint corresponding to FIG. 8H is I=0.247, and the interest value of a third viewpoint corresponding to FIG. 8I is I=0.264.

As illustrated in FIG. 8A to FIG. 8I, the interest value I varies with different weights, and produces different image effects, which proves that the embodiment of the present disclosure can enable the image to better exhibit the user's expected scene by introducing the weights.

The navigation method based on a three-dimensional scene in the embodiment of the present disclosure seizes the essence of the high efficient navigation, i.e., the camera control. When the trajectory parameters of the camera are to be generated, a sequence of a series of camera positions is sought, including camera three-dimensional positions and camera orientations, and the camera moving speeds at those camera positions are researched.

Irrespective of the change of yaw angle, the camera position is usually indicated with five freedom degrees, including camera three-dimensional position, camera orientation, camera pitch angle, camera moving speed and tracked object moving speed.

The navigation method in the embodiment of the present disclosure is based on some key ideas. Firstly, an optimized speed of the tracked object (the same as the camera moving speed) in each iteration is calculated. The camera position is given to obtain a definite interest value of the viewpoint, and the speed of the tracked object is obtained through a simple and solvable scheme. Next, in order to avoid the drastic change of the camera position, the movement path is adaptively smoothed, so as to generate a series of camera positions and camera focal points according to the speed of the tracked object (the region of high speed movement is more smoothed). Next, in order to ensure the visual comfort and continuously track the object, the camera height and distance to the object are increased when the tracked object speeds up. Finally, the optimized camera posture at each focus is calculated by solving a minimum object equation.

In one embodiment, there is given a planned route along which uniform sampling is performed, e.g., taking a sample point every 10 m (dense sampling), and the positions of those sample points are marked as $p_j$, $j \in [0,n]$, each $p_j$ being a three-dimensional position in the path.

Figure 9:
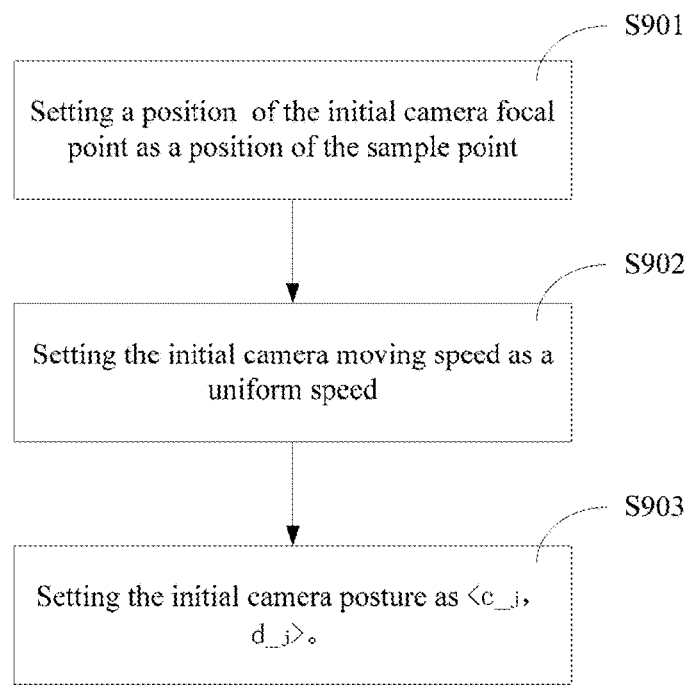
FIG. 9 is a flow diagram of an initialization process in one embodiment of the present disclosure.

FIG. 9 is a flow diagram of an initialization process in one embodiment of the present disclosure. As illustrated in FIG. 9, the step S302 of setting an initial camera focal point, an initial camera moving speed and an initial camera posture at the sample point may comprise:

step S901: setting a position $f_1$ of the initial camera focal point as a position $p_1$ of the sample point, wherein j is a serial number of the sample point;

step S902: setting the initial camera moving speed as a uniform speed;

step S903: setting the initial camera posture as $<c_j,d_j>$. wherein $$c_j = f_{j-2} + [0, 0, e], d_j = \frac{f_j - c_j}{\|f_j - c_j\|},$$

and $c_j$ is an initial position of the camera at the $j^{th}$ sample point; $d_j$ is a unit vector of the initial orientation of an camera at the $j^{th}$ sample point; e is an initial height from the camera to the ground at the sample point; and $f_{j-2}$ is a position of an initial camera focal point at the $(j-2)^{th}$ sample point; $j \in [0, n]$, $n>1$, and n is a positive integer.

In one embodiment, the aspect ratio of the screen is 16:9; corresponding horizontal and vertical viewing fields are 60° and 36°, respectively; and the pitch angle of the camera is raised by 6° in the direction vector to ensure that the camera focal point is always positioned at ⅓ of the frame bottom. The camera orientation is determined by the horizontal part of $d_j$.

In step S901, the initial camera focal point at each sample point is corresponding to the navigation point (sample point), i.e., $f_j = p_j$. In step S902, the initial moving speeds of the tracked object and the camera are both uniform, thus the camera always keeps a constant distance and height to the tracked object.

After the camera posture is corrected, the speed of the tracked object at each sample point in the planned route is adjusted, which will influence the camera moving speed and the camera posture. The user hopes that more time is spent in the place having a high interest value, the camera follows more closely when the tracked object moves at a low speed, and the vision is comfortable when the tracked object speeds up.

In one embodiment, a group uniform sample points in the planned route are given to find an optimized time $t_j$, i.e., the time of movement of the tracked object between $p_j$ (the position of the $j^{th}$ sample point) and $p_{j+1}$ (the position of the $(j+1)^{th}$ sample point). Each camera focal point is corresponding to one camera posture $<c_j, d_j>$, and the viewpoint corresponding to the one camera posture can render one interest value graph, thus accordingly calculating a score $I_j$ of interest value.

In the embodiment of the present disclosure, $t_j$ can be calculated firstly by solving the following the most constraint equation:

$$\operatorname*{argmax}_{t_j} \sum_{j=0}^{n-1} f(t_j) I_j, \text{ wherein, } \sum t_j = T, \qquad (11)$$

In formula (11), it is set that $f(t_j)=\sqrt{t_j}$, wherein $I_j$ the interest value of the viewpoint at the $j^{th}$ sample point, and T is the total navigation time. The function $f(t_j)$ determines the variation of the speed with the interest value. $f(t_j)=\sqrt{t_j}$ ensures the strong non-linear association between the speed and the interest value, and a simple and solvable scheme is obtained at the same time, i.e., the optimized time $t_j$ is obtained by solving the most constraint equation—formula (11) through a maximum dot product high dimension vector $\sqrt{t}=\{\sqrt{t_j}\}$ and a high dimension vector $I=\{I_j\}$.

The maximum dot product high dimension vector $\{\sqrt{t_j}\}$ and $\{\sqrt{I_j}\}$ is:

$$\Sigma \sqrt{t_i} I_i = \|\sqrt{t}\| \|I\| \cos(\theta) = \sqrt{T} \|I\| \cos(\theta) \qquad (12),$$

In formula (12), $\theta$ is an angle between a vector $\sqrt{t}=\{\sqrt{t_j}\}$ and a vector $I=\{I_j\}$. Since T is given, $\|I\|$ may be a constant, and the maximization of the dot product only requires $\theta=0$. In other words, the two vectors shall be collinear. A constant $\beta$ is set so that $\sqrt{t_j}=\beta I_j$, and for each j, $\beta=\sqrt{T}/\|I\|$. Each section of the planned route from $p_j$ to $p_{j+1}$ is set as an identical distance $\Delta$, then the speed $v_j$ can be simply represented as $\Delta/t_j$, and the optimized speed (corrected camera moving speed/tracked object speed) meets $$v_j = \frac{\Delta}{t_j} = C/I_j^2,$$

wherein C is a constant ($C=\Delta/\beta^2$), and $\|I\|$ is a modulus of the high dimension vector I.

Therefore, the interest value of the viewpoint in the embodiment of the present disclosure is limited within a range, and the camera moving speed (tracked object speed) is also limited within a range.

If the initial camera trajectory simply follows the planned route and the camera focal point, a poor user experience will be led to, because the speed is increased at the dull part, which causes violent swinging and turning of the camera. The navigation method in the embodiment of the present disclosure can overcome the above defect by making an adaptive smoothing according to the camera moving speed in each iteration.

In one embodiment, the camera trajectory is adaptively weight-smoothed according to the camera moving speed, the position of the camera focal point is recalculated, and the corrected position of the camera focal point at the sample point is:

$$f_j = \frac{\sum_{j-M \leq h \leq j+M} p_h}{2M + 1}, \qquad (13)$$

In formula (13), M is the number of sample points travelled by the tracked object of the camera at the sample point within a predetermined time. For example, if the predetermined time is 6 seconds, M is the number of sample points travelled by the tracked object within 6 seconds. M is an integer, M≥1, $p_h$ is the position of the camera initial focal point at the $h^{th}$ sample point.

Figures 10A, 10B:
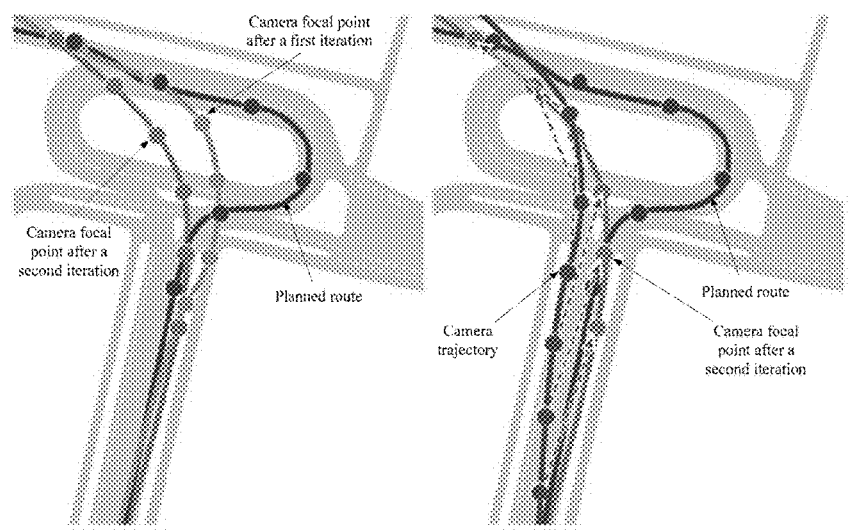
FIG. 10A is a diagram of smooth results after two iterations in one embodiment of the present disclosure.
FIG. 10B is a diagram of a trajectory of a camera corresponding to the smooth result after a second iteration in FIG. 10A
Figure 11:
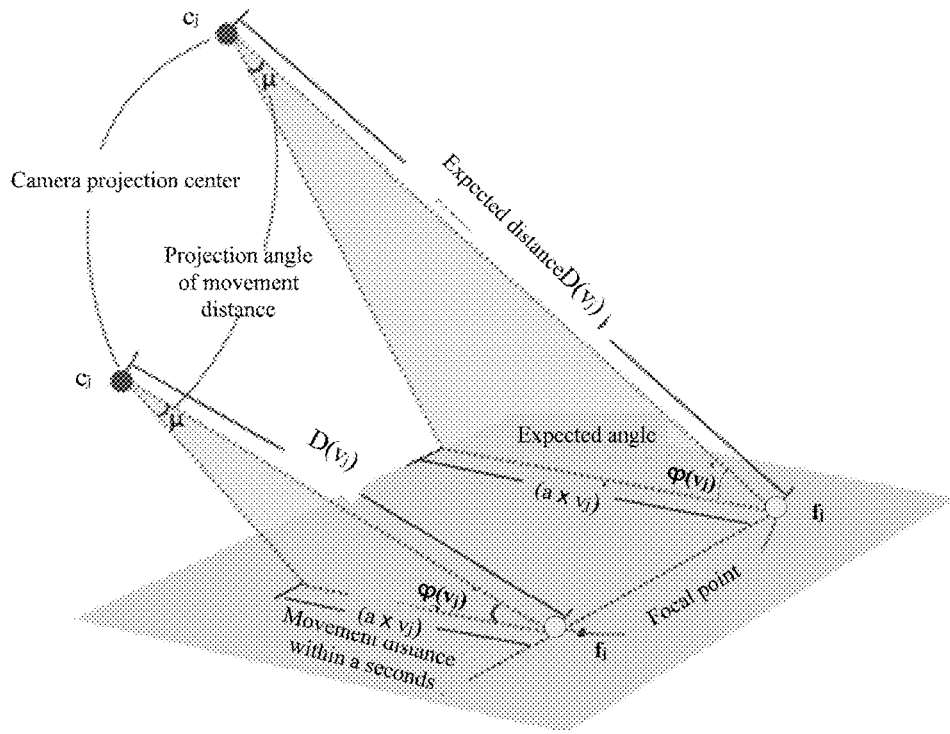
FIG. 11 is a diagram of changes of an expected distance and a camera posture along with a speed increase in one embodiment of the present disclosure.

FIG. 10A is a diagram of smooth results after two iterations in one embodiment of the present disclosure. As illustrated in FIG. 10A, the corrected camera focal point better meets the user's expectation.

In one embodiment, the camera posture can be adjusted according to the corrected/optimized camera moving speed $v_j$ at each sample point and corresponding (corrected/optimized) focal point $f_j$ that should be tracked by the camera. The camera posture<$c_j,d_j$> is recalculated for each camera focal point $f_j$.

The corrected camera posture at the sample point is obtained through the following minimum energy equation:

$$\underset{\langle c_j, d_j \rangle}{\operatorname{argmin}}(aE_d(c_j, f_j, v_j) + bE_p(c_j, d_j, f_j) + cE_s(c_j, d_j)), \quad (14)$$

In formula (14), $E_d(c_j,f_j,v_j)$ is a distance item, $E_p(c_j,d_j,f_j)$ is a projection item, $E_s(c_j,d_j)$ is a smoothing item, and a, b and c are predetermined coefficients.

In formula (14), the distance item $E_d$ ensures that the camera is at appropriate distance and height to the focal point. The projection item $E_p$ ensures an expected projection position on the frame. Finally, the smoothing item $E_s$ reduces the larger camera posture change between adjacent focal points.

The distance item is calculated through two constraints, i.e., an expected pitch angle $\Phi$ and an expected distance D:

$$E_d(c_j,f_j,v_j)=(\|c_j-f_j\|-D(v_j))^2+(c_j^z-f_j^z-H(v_j))^2 \quad (15),$$

In formula (15), the expected distance from the initial position $c_j$ of the camera at the $j^{th}$ sample point to the position $f_j$ of the initial camera focal point at the sample point is:

$$D(v_j) = \alpha v_j \frac{\sin(\Phi(v_j + \mu))}{\sin(\mu)}, \quad (16)$$

In formula (16), $\mu$ is a given angle value, $\alpha$ is a given movement time of the tracked object, $c_j^z$ is a vertical component of $c_j$, and $f_j^z$ is a vertical component of $f_j$.

In the expected distance $D(v_j)$, $\alpha v_j$ is a distance moved by the tracked object within $\alpha$ seconds. As illustrated in FIG. 1, the expected distance $D(v_j)$ ensures that the moved distance is included in the angle range of $\mu$. The constant parameter ace may be set as 20, and the constant parameter $\mu$ may be set as 20°.

The expected height from the camera at the $j^{th}$ sample point to the ground is $$H(v_j)=D(v_j)\sin(\Phi)(v_j)) \quad (17),$$

In formula (17), the expected pitch angle of the camera at the sample point is $$\Phi(v_j) = \Phi_{min} + \frac{v_j - v_{min}}{v_{max} - v_{min}}(\Phi_{max} - \Phi_{min}), \quad (18)$$

In formula (18), $v_{min}$ is a minimum value among all the corrected camera moving speeds at the sample point, $v_{max}$ is a maximum value among all the corrected camera moving speeds at the sample point, $\Phi_{max}$ is a preset maximum pitch angle value among all the pitch angles of the camera at the sample point, and $\Phi_{min}$ is a preset minimum pitch angle value among all the pitch angles of the camera at the sample point. In one embodiment, $\Phi_{max}$ is set as 40°, and $\Phi_{min}$ is set as 10°.

The projection item is $$E_p(c_j, d_j, f_j) = \frac{f_j - c_j}{\|f_j - c_j\|} \cdot R(d_j), \quad (19)$$

In formula (19), $R(d_j)$ is a projection unit vector of the tracked object (camera focal point) on a navigation image at the $j^{th}$ sample point (a position at the center in the horizontal direction and at a distance of ⅓ to the bottom in the vertical direction), and $d_j$ is a unit vector of an initial orientation of the camera at the $j^{th}$ sample point.

The smoothing item is $$E_s(c_j, d_j) = \lambda_1 d_j \cdot d_{j-1} + \lambda_2 \frac{c_j - c_{j-1}}{\|c_j - c_{j-1}\|} \cdot \frac{c_{j-1} - c_{j-2}}{\|c_{j-1} - c_{j-2}\|}, \quad (20)$$

In formula (18), $\lambda_1$ and $\lambda_2$ are predetermined constants, $d_{j-1}$ is a unit vector of an initial orientation of the camera at the $(j-1)^{th}$ sample point, $c_{j-1}$ is an initial position of the camera at the $(j-1)^{th}$ sample point, and $c_{j-2}$ is an initial position of the camera at the $(j-2)^{th}$ sample point. In one embodiment, $\lambda_1=500$, $\lambda_2=1200$.

To be noted, in the above multiple calculations, the parameters such as camera position and camera focal point use the initial values, because it is the case of the first iteration. In the subsequent iterations, the above parameters shall be updated according to the iteration rule in the embodiment of the present disclosure.

The navigation method in the embodiment of the present disclosure spends more time in the place having a high interest value. When the tracked object moves slowly, the camera follows more closely, and is nearly at a ground height, thus the high-speed navigation is almost equivalent to the driver's viewpoint. When the speed rises, the height and the distance are both increased to avoid the visual discomfort.

FIG. 10B is a diagram of a trajectory of a camera corresponding to the smooth result after a second iteration in FIG. 10A. As illustrated in FIG. 10B, the camera positions at the sample points are one-to-one corresponding to the camera focal points after the second iteration. According to the calculation of the embodiment, continuous camera focal points can be obtained by means of linear interpolation.

In the embodiment of the present disclosure, two constraints are used to achieve the above effect. Firstly, the pitch angle $\Phi$ between the vector $f_j-c_j$ and the horizontal plane shall be increased proportionally with the speed. Secondly, regardless of the speed, the ground distance shall keep a range covered by the time constant, and be included in a constant angle $\mu$.

Figure 12:
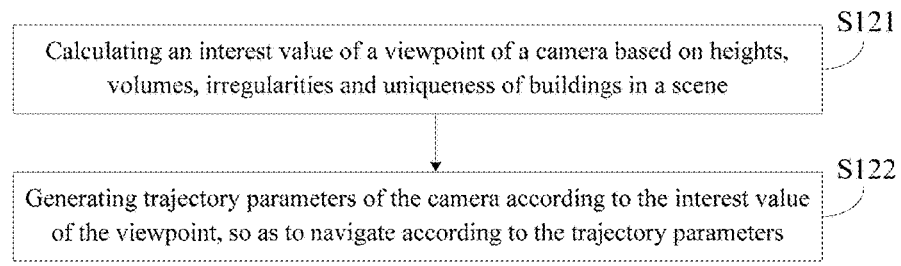
FIG. 12 is a flow chart of implementation of exemplary computer readable instructions in FIGS. 1 to 11.

FIG. 12 is a flow chart of implementation of exemplary computer readable instructions in FIGS. 1 to 11. As illustrated in FIG. 12, when being executed, the computer readable instructions enable a processor to at least perform the operations of:

S121: calculating an interest value of a viewpoint of a camera based on heights, volumes, irregularities and uniqueness of buildings in a scene;

S122: generating trajectory parameters of the camera according to the interest value of the viewpoint, so as to navigate according to the trajectory parameters.

The implementation of the flow as illustrated in FIG. 12 has been detailedly descried with reference to FIGS. 1 to 11, which is omitted herein.

Figure 13:
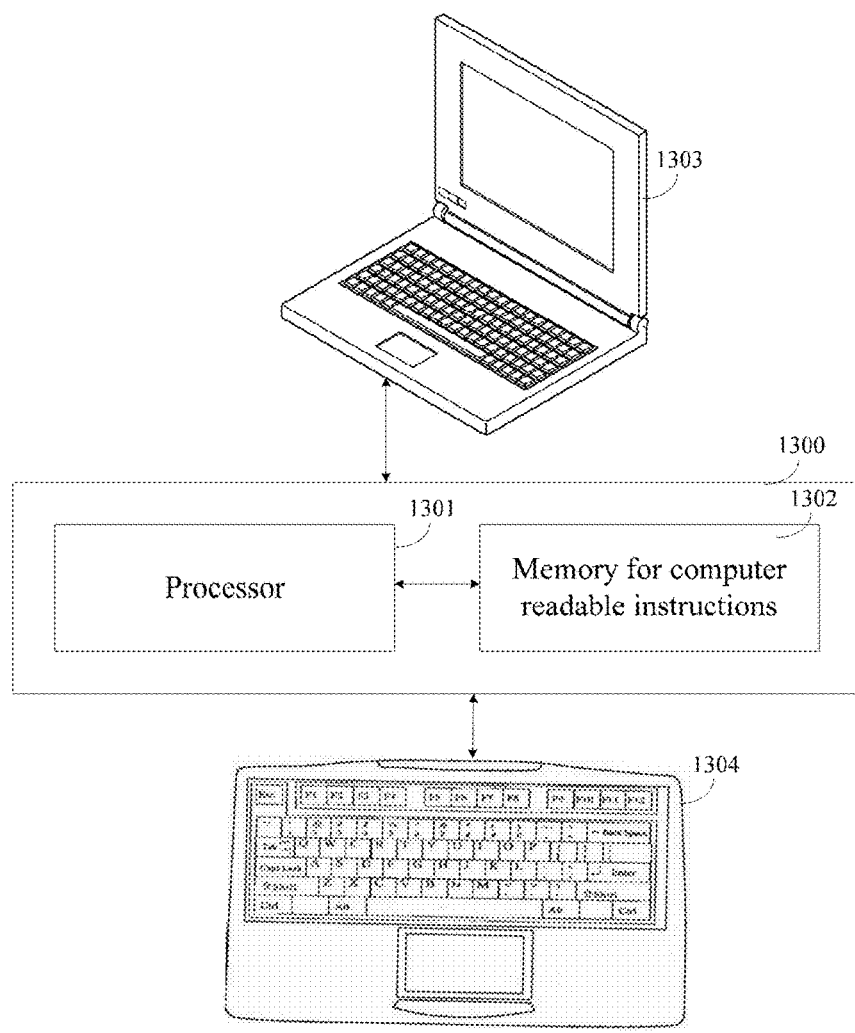
FIG. 13 is a structure diagram of a device in the embodiment of the present disclosure.

The embodiment of the present disclosure provides a device, as illustrated in FIG. 13, comprising:

a processor; and a memory for computer readable instructions, which when being executed, enable the processor to perform the operations of:

calculating an interest value of a viewpoint of a camera based on heights, volumes, irregularities and uniqueness of buildings in a scene;

generating trajectory parameters of the camera according to the interest value of the viewpoint, so as to navigate according to the trajectory parameters.

FIG. 13 is a structure diagram of a device 1300 in the embodiment of the present disclosure. The device 1300 comprises an exemplary processor 1301 capable of executing the instructions of FIG. 12 to implement FIGS. 1 to 11, and a memory 1302 for computer readable instructions. The processor 1301 for example may be a server, a personal computer or any other type of computing device. As illustrated in FIG. 13, the device 1300 may be connected with a computer 1303 and an input device such as a keyboard 1304.

The navigation method based on a three-dimensional scene, the computer readable storage medium and the device in the embodiments of the present disclosure comprehensive consider various influence factors during the navigation, such as heights, volumes, irregularities and uniqueness of the buildings in the scene, so that the navigation screen better meets the user's expectation. In addition, the navigation method in the embodiment of the present disclosure further has the following advantages:

1) automatic navigation: the process of generating the interest value of the viewpoint is an automatic analysis process, without operations such as manual marking; and the generation of the camera trajectory does not require manual adjustment, correction or initial value setting;

2) high navigation quality: the generated camera movement trajectory is very smooth, and the smooth result is much better than that in the prior art; particularly, when the viewpoint and the camera moving speed are changed, the camera trajectory can be absolutely smooth; at the same time, the camera in the embodiment of the present disclosure can always track a certain definite road object, thus ensuring that the user will not have a sense of loss when viewing a navigation image;

3) high navigation efficiency: as to a very long scene, it ensures that a scene navigation can be completed at a fastest speed under the condition that most key information can be obtained, ensures that the user will not spend too much time in a dull scene while can notice a position having a very high interest value;

4) simple interaction: it is unnecessary for the user to perform many complex and fussy operations such as calibration, or set some parameters of the camera; the user only needs to specify the start and end points of the planned route, and set the total navigation time, without additional learning;

5) high portability: the camera path can be generated automatically for various application scenes just by changing the interest value equation of the algorithm; thus the navigation method in the embodiment of the present disclosure can not only be used for driving navigation, but also applied to the aspects such as automatic path-finding of games, military parade, unmanned aerial vehicle, etc.

A person skilled in the art shall understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or block diagram of the method, device (system) and computer program product according to the embodiments of the present disclosure. It shall be understood that each flow and/or block in the flow diagram and/or block diagram and a combination of the flow and/or block in the flow diagram and/or block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above are only the preferable embodiments of the present disclosure, and are not used for limiting the present disclosure. For a person skilled in the art, the embodiments of the present disclosure can be modified and changed variously. Any modification, equivalent substitutions and improvements within the spirit and principle of the present disclosure shall be contained in the protection scope of the present disclosure.

The invention claimed is:

1. A navigation method based on a three-dimensional scene, comprising:

calculating an interest value of a viewpoint of a camera based on heights, volumes, irregularities and uniqueness of buildings in a scene; a camera position is corresponding to the viewpoint, the viewpoint is corresponding to the scene, and the scene is corresponding to a plurality of buildings; for the viewpoint, an importance value of each building in the scene corresponding to the viewpoint is calculated, and then the importance values of the buildings are further processed to obtain the interest value of the viewpoint;

generating trajectory parameters of the camera according to the interest value of the viewpoint, so as to navigate according to the trajectory parameters.

2. The navigation method based on a three-dimensional scene according to claim 1, wherein calculating an interest value of a viewpoint of a camera based on heights, volumes, irregularities and uniqueness of buildings in a scene comprises:

calculating importance values of the buildings based on heights, volumes, irregularities and uniqueness of the buildings;

generating an interest value graph of the viewpoint according to the importance values of the buildings;

correcting the interest value graph through a center weight and a height weight;

inversely calculating the corrected interest value graph to obtain the interest value of the viewpoint.

3. The navigation method based on a three-dimensional scene according to claim 2, wherein generating trajectory parameters of the camera according to the interest value of the viewpoint comprises:

step 101: selecting a planned route from the scene, and uniformly sampling the planned route to obtain a plurality of sample points;

step 102: weight-smoothing the planned route according to the interest value of the viewpoint at the sample point, and taking a position on the weight-smoothed planned route corresponding to the sample point as a corrected camera focal point at the sample point;

step 103: correcting a camera moving speed at the sample point according to a set total navigation time and the interest value of the viewpoint at the sample point;

step 104: correcting the camera posture at the sample point according to the corrected camera moving speed at the sample point;

wherein, the corrected camera posture at the sample point and the corrected camera moving speed at the sample point are the trajectory parameters of the camera.

4. The navigation method based on a three-dimensional scene according to claim 3, wherein before step 102, the navigation method further comprises:

setting an initial camera focal point, an initial camera moving speed and an initial camera posture at the sample point.

5. The navigation method based on a three-dimensional scene according to claim 4, wherein generating trajectory parameters of the camera according to the interest value of the viewpoint further comprises:

re-obtaining the interest value of the viewpoint at the sample point according to the corrected camera focal point at the sample point, the corrected camera moving speed at the sample point, and the corrected camera posture at the sample point; if a difference between a next interest value and a previous interest value of the viewpoint at the sample point is larger than a set threshold, replacing the previous interest value of the viewpoint at the sample point with the next interest value of the viewpoint at the sample point, replacing a previous camera focal point at the sample point with a next camera focal point at the sample point, replacing a previous camera moving speed at the sample point with a next camera moving speed at the sample point, and replacing a previous camera posture at the sample point with a next camera posture at the sample point, repetitively and iteratively perform step 102, step 103 and step 104.

6. The navigation method based on a three-dimensional scene according to claim 5, wherein the importance value of the building is:

$$S(b) = \alpha S_h(b) + \beta S_v(b) + \gamma S_r(b) + \delta S_u(b),$$

wherein, $\alpha$, $\beta$, $\gamma$ and $\delta$ are weight coefficients, $S_h(b)$ is a height interest value of building b, $S_v(b)$ is a volume importance value of building b, $S_r(b)$ is an irregularity value of building b, $S_u(b)$ is an uniqueness value of building b, and building b is the building, $$S_h(b) = \frac{\text{height}(b)}{\max_c \in \Omega \text{height}(c)},$$

wherein, height (b) is a height of building b, and $\Omega$ height (c) is a set of heights of building c near the planned route, $$S_v(b) = \frac{\text{volume}(b)}{\max_c \in \Omega \text{volume}(c)},$$

wherein, volume (b) is a volume of building b, and $\Omega$ volume (c) is a set of volumes of building c near the planned route, $$S_r(b) = 1 - \frac{\text{volume}(b)}{\text{volume}(MVBB(b))},$$

wherein, volume (MVBB(b)) is a volume of a body bounding box MVBB(b) of building b, $$S_u(b) = \min_{d \in \Omega_b} M(b, d),$$

wherein, $\Omega_b$ is a set of buildings d within a predetermined range near building b, and an uniqueness difference between building b and buildings d within the predetermined range is $$M(b, d) = 1 - \frac{\text{volume}(\bigcap(MVBB(b), MVBB(d)))}{\text{volume}(\bigcup(MVBB(b), MVBB(d)))},$$

wherein, volume ($\cap$(MVBB(b), MVBB(d))) is a volume of an intersection result $\cap$(MVBB (b), MVBB(d)) of a body bounding box MVBB(b) of building b and a body bounding box MVBB(d) of building d, and volume (U(MVBB(b), MVBB(d))) is a volume of an union result U(MVBB(b), MVBB(d)) of the body bounding box MVBB(b) of building b and the body bounding box MVBB(d) of building d.

7. The navigation method based on a three-dimensional scene according to claim 6, further comprising:

Calculating the weight coefficients $\alpha$, $\beta$, $\gamma$ and $\delta$ by solving an optimized weight equation which is $$(\alpha, \beta, \gamma, \delta) = \arg\min_{\substack{(\alpha,\beta,\gamma,\delta) \\ \alpha+\beta+\gamma+\delta=1}} \sum_i K(R(\alpha, \beta, \gamma, \delta), R_i),$$

wherein, $R_i$ is a given user scoring value based on height, volume, irregularity and uniqueness of a buildings in a given set of buildings; $R(\alpha,\beta,\gamma,\delta)$ is an importance value calculated according to values of a given group of weight coefficients and values of $S_h(b)$, $S_v(b)$, $S_r(b)$ and $S_u(b)$ of the building in the given set of buildings; $K(R(\alpha,\beta,\gamma,\delta),R_i)$ is a first distance between the given user scoring value $R_i$ and the importance value $R(\alpha,\beta,\gamma,\delta)$ of the building in the set of buildings; and if the first distance is less than a set distance, the values of the group of weight coefficients are taken as values of the weight coefficients $\alpha$, $\beta$, $\gamma$ and $\delta$.

8. The navigation method based on a three-dimensional scene according to claim 6, wherein when correcting the interest value graph through a center weight and a height weight, The center weight is $$\omega_c(i) = \sqrt{\cos\left(\frac{\pi\|i - o\|}{2r}\right)},$$

wherein, i is a pixel position in the interest value graph, o is a center of the interest value graph, and r is a half of a diagonal of the interest value graph;

the depth weight is $$\omega_d(i) = \min\left(\left(\frac{d(i)}{d^*}\right)^2, 1\right),$$

wherein, d' is a set viewing depth, and d(i) is a viewing depth at the pixel position i;

the interest value of the viewpoint corresponding to the corrected interest value graph is $$I_j = \frac{1}{N}\sum_i \omega_c(i)\omega_d(i)S(i),$$

wherein, N is the number of pixels in the interest value graph, N≥1, and N is an integer; j is a serial number of the sample point, j∈[0,n],n>1, and n is a positive integer; S(i) is an interest value of the viewpoint at the pixel position i in the interest value graph.

9. The navigation method based on a three-dimensional scene according to claim 8, wherein setting an initial camera focal point, an initial camera moving speed and an initial camera posture at the sample point comprises:

setting a position $f_j$ of the initial camera focal point as a position $p_j$ of the sample point, wherein j is a serial number of the sample point;

setting the initial camera moving speed as a uniform speed;

setting the initial camera posture as $<c_j,d_j>$, wherein $c_j=f_{j-2}+[0,0,e]$, $$d_j = \frac{f_j - c_j}{\|f_j - c_j\|},$$

wherein, $c_j$ is an initial position of the camera at the $j^{th}$ sample point; $d_j$ is a unit vector of the initial orientation of an camera at the $j^{th}$ sample point; e is an initial height from the camera to the ground at the sample point; and $f_{j-2}$ is a position of an initial camera focal point at the $(j-2)^{th}$ sample point; j∈[0,n],n>1, and n is a positive integer.

10. The navigation method based on a three-dimensional scene according to claim 9, wherein in step 102, the corrected position of the camera focal point at the sample point is:

$$f_j = \frac{\sum_{j-M \le h \le j+M} p_h}{2M + 1},$$

wherein, M is the number of sample points traveled by the tracked object of the camera at the sample point within a predetermined time, M is an integer, M≥1, and $p_h$ is the position of the camera initial focal point at the $h^{th}$ sample point.

11. The navigation method based on a three-dimensional scene according to claim 10, wherein step 103 comprises:

Obtaining an optimized time $t_j$ by solving the most constraint equation through a maximum dot product high dimension vector $\sqrt{t}=\{\sqrt{t_j}\}$ and a high dimension vector $I=\{I_j\}$;

wherein, the optimized time $t_j$ is time of movement of the camera from a camera position at the $j^{th}$ sample point to a camera position at the $(j+1)^{th}$ sample point, and the most constraint equation is $$\operatorname*{argmax}_{t_j} \sum_{j=0}^{n-1} f(t_j)I_j, \text{ wherein, } \sum t_j = T,$$

wherein, $f(t_j)=\sqrt{t_j}$, $I_j$ is an interest value of the viewpoint at the $j^{th}$ sample point, and T is total navigation time;

intervals from the camera position at the $j^{th}$ sample point to the camera position at the $(j+1)^{th}$ sample point are all set as a given second distance $\Delta$;

according to the optimized time $t_j$ and the second distance $\Delta$, the corrected camera moving speed at the sample point is obtained as $$v_j = \frac{\Delta}{t_j} = C/I_j^2,$$

wherein constants $C=\Delta/\beta^2$, $\beta=T/\|I\|$ and $\|I\|$ is a modulus of the high dimension vector I.

12. The navigation method based on a three-dimensional scene according to claim 11, wherein in step 104, the corrected camera posture at the sample point is obtained through a minimum energy equation;

wherein, the minimum energy equation is $$\operatorname*{argmin}_{\langle c_j, d_j \rangle}(aE_d(c_j, f_j, v_j) + bE_p(c_j, d_j, f_j) + cE_s(c_j, d_j)),$$

wherein, $E_d(c_j,f_j,v_j)$ is a distance item, $E_p(c_j,d_j,f_j)$ is a projection item, $E_s(c_j,d_j)$ is a smoothing item, and a, b and c are predetermined coefficients;

the distance item $E_d(c_j,f_j,v_j)=(\|c_j-f_j\|-D(v_j))^2+(c_j^z-f_j^z-H(v_j))^2$, wherein, an expected distance from the initial positions $c_j$ of the camera at the $j^{th}$ sample point to the position $f_j$ of the initial camera focal point at the sample point is:

$$D(v_j) = \alpha v_j \frac{\sin(\Phi(v_j + \mu))}{\sin(\mu)},$$

$\mu$ is a given angle value, $\alpha$ is given movement time of the tracked object, $c_j^z$ is a vertical component of $c_j$, and $f_j^z$ is a vertical component of $f_j$;

An expected height from the camera at the $j^{th}$ sample point to the ground is $H(v_j)=D(v_j)\sin(\Phi(v_j))$, wherein, an expected pitch angle of the camera at the sample point is $$\Phi_{min} + \frac{v_j - v_{min}}{v_{max} - v_{min}}(\Phi_{max} - \Phi_{min}),$$

wherein, $v_{min}$ is a minimum value among all the corrected camera moving speeds at the sample point, is a maximum value among all the corrected camera moving speeds at the sample point, $\Phi_{min}$ is a preset maximum pitch angle value among all the pitch angles of the camera at the sample point, and $\Phi_{min}$ is a preset minimum pitch angle value among all the pitch angles of the camera at the sample point;

The projection item $$E_p(c_j, d_j, f_j) = \frac{f_j - c_j}{\|f_j - c_j\|} \cdot R(d_j),$$

wherein, $R(d_j)$ is a projection unit vector of the tracked object on a navigation image at the $j^{th}$ sample point, and $d_j$ is a unit vector of an initial orientation of the camera at the $j^{th}$ sample point;

the smoothing item $$E_s(c_j, d_j) = \lambda_1 d_j \cdot d_{j-1} + \lambda_2 \frac{c_j - c_{j-1}}{\|c_j - c_{j-1}\|} \cdot \frac{c_{j-1} - c_{j-2}}{\|c_{j-1} - c_{j-2}\|},$$

wherein, $\lambda_1$ and $\lambda_2$ are predetermined constants, $d_{j-1}$ is a unit vector of an initial orientation of the camera at the $(j-1)^{th}$ sample point, $c_{j-1}$ is an initial position of the camera at the $(j-1)^{th}$ sample point, and $c_{j-2}$ is an initial position of the camera at the $(j-2)^{th}$ sample point.

13. A computer readable storage medium containing computer readable instructions, wherein when being executed, the computer readable instructions enable a processor to perform at least the operations of:

calculating an interest value of a viewpoint of a camera based on heights, volumes, irregularities and uniqueness of buildings in a scene; a camera position is corresponding to the viewpoint, the viewpoint is corresponding to the scene, and the scene is corresponding to a plurality of buildings; for the viewpoint, an importance value of each building in the scene corresponding to the viewpoint is calculated, and then the importance values of the buildings are further processed to obtain the interest value of the viewpoint;

generating trajectory parameters of the camera according to the interest value of the viewpoint, so as to navigate according to the trajectory parameters.

14. The computer readable storage medium according to claim 13, wherein calculating an interest value of a viewpoint of a camera based on heights, volumes, irregularities and uniqueness of buildings in a scene comprises:

calculating importance values of the buildings based on heights, volumes, irregularities and uniqueness of the buildings;

generating an interest value graph of the viewpoint according to the importance values of the buildings;

correcting the interest value graph through a center weight and a height weight;

inversely calculating the corrected interest value graph to obtain the interest value of the viewpoint.

15. The computer readable storage medium according to claim 14, wherein generating trajectory parameters of the camera according to the interest value of the viewpoint comprises:

step 101: selecting a planned route from the scene, and uniformly sampling the planned route to obtain a plurality of sample points;

step 102: weight-smoothing the planned route according to the interest value of the viewpoint at the sample point, and taking a position on the weight-smoothed planned route corresponding to the sample point as a corrected camera focal point at the sample point;

step 103: correcting a camera moving speed at the sample point according to a set total navigation time and the interest value of the viewpoint at the sample point;

step 104: correcting the camera posture at the sample point according to the corrected camera moving speed at the sample point;

wherein, the corrected camera posture at the sample point and the corrected camera moving speed at the sample point are the trajectory parameters of the camera.

16. The computer readable storage medium according to claim 15, wherein before step 102, further comprising:

setting an initial camera focal point, an initial camera moving speed and an initial camera posture at the sample point.

17. The computer readable storage medium according to claim 16, further comprising:

re-obtaining the interest value of the viewpoint at the sample point according to the corrected camera focal point at the sample point, the corrected camera moving speed at the sample point, and the corrected camera posture at the sample point; if a difference between a next interest value and a previous interest value of the viewpoint at the sample point is larger than a set threshold, replacing the previous interest value of the viewpoint at the sample point with the next interest value of the viewpoint at the sample point, replacing a previous camera focal point at the sample point with a next camera focal point at the sample point, replacing a previous camera moving speed at the sample point with a next camera moving speed at the sample point, and replacing a previous camera posture at the sample point with a next camera posture at the sample point, repetitively and iteratively perform step 102, step 103 and step 104.

18. The computer readable storage medium according to claim 17, wherein the importance value of the building is:

$$S(b)=\alpha S_h(b)+\beta S_v(b)+\gamma S_r(b)+\delta S_u(b),$$

wherein, $\alpha$, $\beta$, $\gamma$ and $\delta$ are weight coefficients, $S_h(b)$ is a height interest value of building b, $S_v(b)$ is a volume importance value of building b, $S_r(b)$ is an irregularity value of building b, $S_u(b)$ is an uniqueness value of building b, and building b is the building, $$S_h(b) = \frac{\text{height}(b)}{\max_{c \in \Omega} \text{height}(c)},$$

wherein, height (b) is a height of building b, and $\Omega$ height (c) is a set of heights of building c near the planned route, $$S_v(b) = \frac{\text{volume}(b)}{\max_{c \in \Omega} \text{volume}(c)},$$

wherein, volume (b) is a volume of building b, and $\Omega$ volume (c) is a set of volumes of building c near the planned route, $$S_r(b) = 1 - \frac{\text{volume}(b)}{\text{volume}(MVBB(b))},$$

wherein, volume (MVBB(b)) is a volume of a body bounding box MVBB(b) of building b, $$S_u(b) = \min_{d \in \Omega_b} M(b, d),$$

wherein, $\Omega_b$ is a set of buildings d within a predetermined range near building b, and a uniqueness difference between building b and buildings d within the predetermined range is $$M(b, d) = 1 - \frac{\text{volume}(\bigcap(MVBB(b), MVBB(d)))}{\text{volume}(U(MVBB(b), MVBB(d)))},$$

wherein, volume ($\cap$(MVBB(b), MVBB(d))) is a volume of an intersection result $\cap$(MVBB(b), MVBB(d)) of a body bounding box MVBB(b) of building b and a body bounding box MVBB(d) of building d, and volume (U(MVBB(b), MVBB(d))) is a volume of an union result U(MVBB(b), MVBB(d)) of the body bounding box MVBB(b) of building b and the body bounding box MVBB(d) of building d.

19. The computer readable storage medium according to claim 18, wherein the navigation method based on a three-dimensional scene further comprises:
Calculating the weight coefficients $\alpha$, $\beta$, $\gamma$ and $\delta$ by solving an optimized weight equation which is $$(\alpha, \beta, \gamma, \delta) = \arg \min_{\substack{(\alpha,\beta,\gamma,\delta) \\ \alpha+\beta+\gamma+\delta=1}} \sum_i K(R(\alpha, \beta, \gamma, \delta), R_i),$$

wherein, $R_i$ is a given user scoring value based on height, volume, irregularity and uniqueness of a buildings in a given set of buildings; $R(\alpha,\beta,\gamma,\delta)$ is an importance value calculated according to values of a given group of weight coefficients and values of $S_h(b)$, $S_v(b)$, $S_r(b)$ and $S_u(b)$ of the building in the given set of buildings; $K(R(\alpha,\beta,\gamma,\delta),R_i)$ is a first distance between the given user scoring value $R_i$ and the importance value $R(\alpha,\beta,\gamma,\delta)$ of the building in the set of buildings; and if the first distance is less than a set distance, the values of the group of weight coefficients are taken as values of the weight coefficients $\alpha$, $\beta$, $\gamma$ and $\delta$.

20. The computer readable storage medium according to claim 18, wherein when correcting the interest value graph through a center weight and a height weight,
the center weight is $$\omega_c(i) = \sqrt{\cos\left(\frac{\pi\|i - o\|}{2r}\right)},$$

wherein, i is a pixel position in the interest value graph, o is a center of the interest value graph, and r is a half of a diagonal of the interest value graph;
the depth weight is $$\omega_d(i) = \min\left(\left(\frac{d(i)}{d^*}\right)^2, 1\right),$$

wherein, $d^*$ is a set viewing depth, and d(i) is a viewing depth at the pixel position i;
the interest value of the viewpoint corresponding to the corrected interest value graph is $$I_j = \frac{1}{N}\sum_i \omega_c(i)\omega_d(i)S(i),$$

wherein, N is the number of pixels in the interest value graph, N≥1, and N is an integer; j is a serial number of the sample point, j∈[0,n],n>1, and n is a positive integer; S(i) is an interest value of the viewpoint at the pixel position i in the interest value graph.

21. The computer readable storage medium according to claim 20, wherein setting an initial camera focal point, an initial camera moving speed and an initial camera posture at the sample point comprises:
setting a position $f_j$ of the initial camera focal point as a position $p_j$ of the sample point, wherein j is a serial number of the sample point;
setting the initial camera moving speed as a uniform speed;
setting the initial camera posture as $<c_j,d_j>$, wherein $$c_j = f_{j-2} + [0, 0, e], d_j = \frac{f_j - c_j}{\|f_j - c_j\|},$$

wherein, $c_j$ is an initial position of the camera at the $j^{th}$ sample point; $d_j$ is a unit vector of the initial orientation of an camera at the $j^{th}$ sample point; e is an initial height from the camera to the ground at the sample point; and $f_{j-2}$ is a position of an initial camera focal point at the $(j-2)^{th}$ sample point; $j \in [0,n], n>1$, and n is a positive integer.

22. The computer readable storage medium according to claim 21, wherein in step 102, the corrected position of the camera focal point at the sample point is:

$$f_j = \frac{\sum_{j-M \leq h \leq j+M} p_h}{2M+1},$$

wherein, M is the number of sample points traveled by the tracked object of the camera at the sample point within a predetermined time, M is an integer, $M \geq 1$, and $p_h$ is the position of the camera initial focal point at the $h^{th}$ sample point.

23. The computer readable storage medium according to claim 22, wherein step 103 comprises:

Obtaining an optimized time $t_j$ by solving the a most constraint equation through a maximum dot product high dimension vector and a high dimension vector $I=\{I_j\}$;

wherein, the optimized time $t_j$ is time of movement of the camera from a camera position at the $j^{th}$ sample point to a camera position at the $(j+1)^{th}$ sample point, and the most constraint equation is $$\operatorname*{argmax}_{t_j} \sum_{j=0}^{n-1} f(t_j) I_j, \text{ wherein, } \sum t_j = T,$$

wherein, $f(t_j) = \sqrt{t_j}, I_j$ is an interest value of the viewpoint at the $j^{th}$ sample point, and T is total navigation time;

intervals from the camera position at the $j^{th}$ sample point to the camera position at the $(j+1)^{th}$ sample point are all set as a given second distance $\Delta$;

according to the optimized time $t_j$ and the second distance $\Delta$, the corrected camera moving speed at the sample point is obtained as $$v_j = \frac{\Delta}{t_j} = C / I_j^2,$$

wherein constants $C = \Delta/\beta^2$, $\beta = \sqrt{T}/\|I\|$ and $\|I\|$ is a modulus of the high dimension vector I.

24. A device, comprising:
a processor; and
a memory for computer readable instructions, which when being executed, enable the processor to perform the operations of:
calculating an interest value of a viewpoint of a camera based on heights, volumes, irregularities and uniqueness of buildings in a scene; a camera position is corresponding to the viewpoint, the viewpoint is corresponding to the scene, and the scene is corresponding to a plurality of buildings; for the viewpoint, an importance value of each building in the scene corresponding to the viewpoint is calculated, and then the importance values of the buildings are further processed to obtain the interest value of the viewpoint;
generating trajectory parameters of the camera according to the interest value of the viewpoint, so as to navigate according to the trajectory parameters.

25. The device according to claim 24, wherein the computer readable instructions further enable the processor to perform the operations of:
calculating importance values of the buildings based on heights, volumes, irregularities and uniqueness of the buildings;
generating an interest value graph of the viewpoint according to the importance values of the buildings;
correcting the interest value graph through a center weight and a height weight;
inversely calculating the corrected interest value graph to obtain the interest value of the viewpoint.

26. The device according to claim 25, wherein the computer readable instructions further enable the processor to perform the operations of:
step 101: selecting a planned route from the scene, and uniformly sampling the planned route to obtain a plurality of sample points;
step 102: weight-smoothing the planned route according to the interest value of the viewpoint at the sample point, and taking a position on the weight-smoothed planned route corresponding to the sample point as a corrected camera focal point at the sample point;
step 103: correcting a camera moving speed at the sample point according to a set total navigation time and the interest value of the viewpoint at the sample point;
step 104: correcting the camera posture at the sample point according to the corrected camera moving speed at the sample point;
wherein, the corrected camera posture at the sample point and the corrected camera moving speed at the sample point are the trajectory parameters of the camera.

27. The device according to claim 26, wherein before step 102, the computer readable instructions further enable the processor to perform the operation of:
Setting an initial camera focal point, an initial camera moving speed and an initial camera posture at the sample point.

28. The device according to claim 27, wherein the computer readable instructions further enable the processor to perform the operations of:
re-obtaining the interest value of the viewpoint at the sample point according to the corrected camera focal point at the sample point, the corrected camera moving speed at the sample point, and the corrected camera posture at the sample point; if a difference between a next interest value and a previous interest value of the viewpoint at the sample point is larger than a set threshold, replacing the previous interest value of the viewpoint at the sample point with the next interest value of the viewpoint at the sample point, replacing a previous camera focal point at the sample point with a next camera focal point at the sample point, replacing a previous camera moving speed at the sample point with a next camera moving speed at the sample point, and replacing a previous camera posture at the sample point with a next camera posture at the sample point, repetitively and iteratively perform step 102, step 103 and step 104.

29. The device according to claim 28, wherein the importance value of the building is $$S(b)=\alpha S_h(b)+\beta S_v(b)+\gamma S_r(b)+\delta S_u(b),$$

wherein, α, β, γ and δ are weight coefficients, $S_h(b)$ is a height interest value of building b, $S_v(b)$ is a volume importance value of building b, $S_r(b)$ is an irregularity value of building b, $S_u(b)$ is an uniqueness value of building b, and building b is the building, $$S_h(b) = \frac{\text{height}(b)}{\max_{c \in \Omega} \text{height}(c)},$$

wherein, height (b) is a height of building b, and Ω height (c) is a set of heights of building c near the planned route, $$S_v(b) = \frac{\text{volume}(b)}{\max_{c \in \Omega} \text{volume}(c)},$$

wherein, volume (b) is a volume of building b, and Ω volume (c) is a set of volumes of building c near the planned route, $$S_r(b) = 1 - \frac{\text{volume}(b)}{\text{volume}(MVBB(b))},$$

wherein, volume (MVBB(b)) is a volume of a body bounding box MVBB(b) of building b, $$S_u(b) = \min_{d \in \Omega_b} M(b, d),$$

wherein, $\Omega_b$ is a set of buildings d within a predetermined range near building b, and an uniqueness difference between building b and buildings d within the predetermined range is $$M(b, d) = 1 - \frac{\text{volume}(\bigcap(MVBB(b), MVBB(d)))}{\text{volume}(U(MVBB(b), MVBB(d)))},$$

wherein, volume (∩(MVBB(b), MVBB(d))) is a volume of an intersection result ∩(MVBB (b), MVBB(d)) of a body bounding box MVBB(b) of building b and a body bounding box MVBB(d) of building d, and volume (U(MVBB(b), MVBB(d))) is a volume of an union result U(MVBB(b), MVBB(d)) of the body bounding box MVBB(b) of building b and the body bounding box MVBB(d) of building d.

30. The device according to claim 29, wherein the computer readable instructions further enable the processor to perform the operations of:
calculating the weight coefficients α, β, γ and δ by solving an optimized weight equation which is $$(\alpha, \beta, \gamma, \delta) = \arg \min_{\substack{(\alpha,\beta,\gamma,\delta) \\ \alpha+\beta+\gamma+\delta=1}} \sum_i K(R(\alpha, \beta, \gamma, \delta), R_i),$$

wherein, $R_i$ is a given user scoring value based on height, volume, irregularity and uniqueness of a buildings in a given set of buildings; $R(\alpha,\beta,\gamma,\delta)$ is an importance value calculated according to values of a given group of weight coefficients and values of $S_h(b)$, $S_v(b)$, $S_r(b)$ and $S_u(b)$ of the building in the given set of buildings; $K(R(\alpha,\beta,\gamma,\delta),R_i)$ is a first distance between the given user scoring value $R_i$ and the importance value $R(\alpha,\beta,\gamma,\delta)$ of the building in the set of buildings; and if the first distance is less than a set distance, the values of the group of weight coefficients are taken as values of the weight coefficients α, β, γ and δ.

31. The device according to claim 29, wherein when correcting the interest value graph through a center weight and a height weight,
The center weight is $$\omega_c(i) = \sqrt{\cos\left(\frac{\pi\|i-o\|}{2r}\right)},$$

wherein, i is a pixel position in the interest value graph, o is a center of the interest value graph, and r is a half of a diagonal of the interest value graph;
the depth weight is $$\omega_d(i) = \min\left(\left(\frac{d(i)}{d^*}\right)^2, 1\right),$$

wherein, d* is a set viewing depth, and d(i) is a viewing depth at the pixel position i;
the interest value of the viewpoint corresponding to the corrected interest value graph is $$I_j = \frac{1}{N}\sum_i \omega_c(i)\omega_d(i)S(i),$$

wherein, N is the number of pixels in the interest value graph, N≥1, and N is an integer; j is a serial number of the sample point, j∈[0,n],n>1, and n is a positive integer; S(i) is an interest value of the viewpoint at the pixel position i in the interest value graph.

32. The device according to claim 31, wherein the computer readable instructions further enable the processor to perform the operations of:
setting a position $f_j$ of the initial camera focal point as a position $p_j$ of the sample point, wherein j is a serial number of the sample point;
setting the initial camera moving speed as a uniform speed;
setting the initial camera posture as $<c_j,d_j>$, wherein $$c_j = f_{j-2} + [0, 0, e], d_j = \frac{f_j - c_j}{\|f_j - c_j\|},$$

wherein, $c_j$ is an initial position of the camera at the $j^{th}$ sample point; $d_j$ is a unit vector of the initial orientation of an camera at the $j^{th}$ sample point; e is an initial height from the camera to the ground at the sample point; and $f_{j-2}$ is a position of an initial camera focal point at the $(j-2)^{th}$ sample point; j∈[0,n],n>1, and n is a positive integer.

33. The device according to claim 32, wherein in step 102, the corrected position of the camera focal point at the sample point is:

$$f_j = \frac{\sum_{j-M \leq h \leq j+M} p_h}{2M+1},$$

wherein, M is the number of sample points traveled by the tracked object of the camera at the sample point within a predetermined time, M is an integer, M≥1, and $p_h$ is the position of the camera initial focal point at the $h^{th}$ sample point.

34. The device according to claim 33, wherein step 103 comprises:

obtaining an optimized time $t_j$ by solving the a most constraint equation through a maximum dot product high dimension vector $\sqrt{t}=\{\sqrt{t_j}\}$ and a high dimension vector $I=\{I_j\}$;

wherein, the optimized time $t_j$ is time of movement of the camera from a camera position at the $j^{th}$ sample point to a camera position at the $(j+1)^{th}$ sample point, and the most constraint equation is $$\operatorname*{argmax}_{t_j} \sum_{j=0}^{n-1} f(t_j) I_j, \text{ where, } \sum t_j = T,$$

wherein, $f(t_j)=\sqrt{t_j}$, $I_j$ is an interest value of the viewpoint at the $j^{th}$ sample point, and T is total navigation time;

intervals from the camera position at the $j^{th}$ sample point to the camera position at the $(j+1)^{th}$ sample point are all set as a given second distance Δ;

according to the optimized time $t_j$ and the second distance Δ, the corrected camera moving speed at the sample point is obtained as $$v_j = \frac{\Delta}{t_j} = C/I_j^2,$$

wherein constants $C=\Delta/\beta^2$, $\beta=\sqrt{T}/\|I\|$ and $\|I\|$ is a modulus of the high dimension vector I.

\* \* \* \* \*